United States Patent [19]

Morel

[11] 4,277,196

[45] Jul. 7, 1981

[54] FIXING DEVICE FOR SECURING ANY PART TO A HOLDING MEMBER SUCH AS A PANEL BY INSERTING SAID FIXING DEVICE INTO A HOLE OF STANDARD SHAPE FORMED IN SAID PANEL

[75] Inventor: Henri Morel, Maule, France

[73] Assignee: ITW de France, Beauchamp, France

[21] Appl. No.: 96,592

[22] Filed: Nov. 21, 1979

[30] Foreign Application Priority Data

Nov. 30, 1978 [FR] France .................................. 78 33799

[51] Int. Cl.³ ............................................. F16B 2/14
[52] U.S. Cl. ........................................ 403/3; 403/409;
411/39; 411/70; 411/77; 411/71; 411/432
[58] Field of Search ............... 403/405, 406, 407, 408,
403/3, 409; 85/74, 75, 79

[56] References Cited

U.S. PATENT DOCUMENTS

| 620,481 | 2/1899 | Moody | 85/79 |
|---|---|---|---|
| 652,644 | 6/1900 | Ross | 85/79 |
| 3,974,735 | 8/1976 | Berner | 85/74 X |

FOREIGN PATENT DOCUMENTS

| 2736012 | 2/1978 | Fed. Rep. of Germany | 403/405 |
|---|---|---|---|
| 436238 | 10/1935 | United Kingdom | 85/74 |
| 1501509 | 2/1978 | United Kingdom | 85/75 |

Primary Examiner—Andrew V. Kundrat
Attorney, Agent, or Firm—J. R. Halvorsen; T. W. Buckman

[57] ABSTRACT

The invention relates to a fixing device for securing any part to a holding member. The fixing device comprises spreadable means in a hole or bore formed in the holding member on the one hand, and on the other hand spreading means. An actuating means is provided to drive the spreading means into the spreadable means so that depending on the length of penetration of the spreading means thereinto the fixing device can be blocked on the holding member and accommodates any thickness variations of said holding member. The invention is used to secure by means of a screw or rivet any part on a holding member such as a panel.

6 Claims, 2 Drawing Figures

FIXING DEVICE FOR SECURING ANY PART TO A HOLDING MEMBER SUCH AS A PANEL BY INSERTING SAID FIXING DEVICE INTO A HOLE OF STANDARD SHAPE FORMED IN SAID PANEL

BACKGROUND OF THE INVENTION

The present invention relates to a fixing device preferably made of plastic material for securing any part to a panel by inserting said fixing device into a bore or hole of standard shape formed in said panel, said hole or bore being round, square, rectangular, oval or being provided with notches and the like; the fixing device accommodating substantial thickness variations in the holding panel. Several forms of embodiment of such a fixing device are known; however they have not all of the above characteristics which are more and more required by users.

SUMMARY OF THE INVENTION

The fixing device according to the invention for securing any part to a holding member is characterized in that it comprises:

means spreadable in a bore formed in the holding member on the one hand;

and on the other hand spreading means;

an actuating means being provided for driving the spreading means into the spreadable means so that depending on the length of penetration of the spreading means there between the fixing device is locked to the holding member and accommodates any thickness variations of said holding member.

BRIEF DESCRIPTION OF THE DRAWINGS

Other characteristics and advantages of the present invention will appear from the following description which is illustrated by the accompanying drawings.

DETAILED DESCRIPTION OF THE INVENTION

Figure 1:
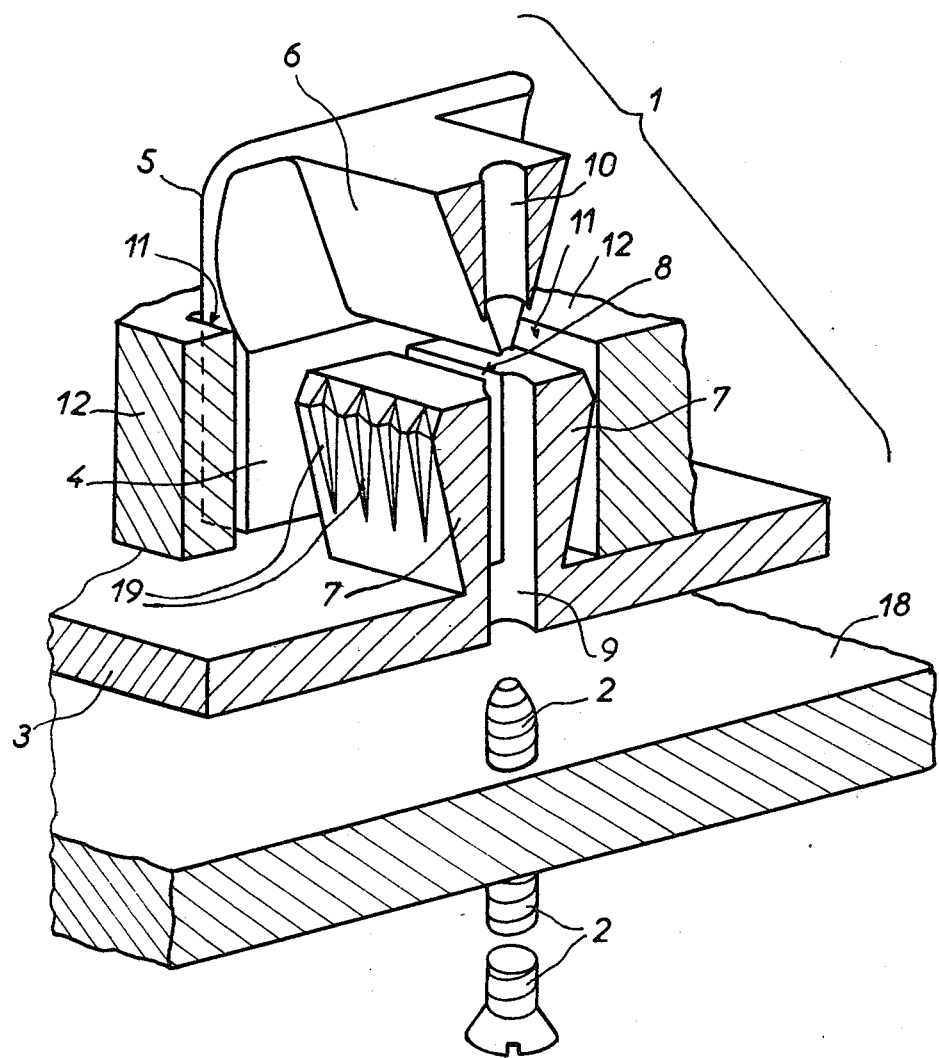
FIG. 1 is a perspective view, half in cross section, of a form of embodiment of a fixing device according to the invention which is locked in place by means of a screw.

In the form of embodiment illustrated on FIG. 1 the fixing device in accordance with the invention is a nut piece 1 traversed by a screw 2.

The nut piece comprises a base 3 supporting a cage 4 having two deformable walls 5 facing each other and a wedge shaped cross piece 6.

Two flexible fixation tabs 7 separated by an interval 8 are disposed under the cross piece. A bore or hole 9 to allow for the passage of the screw 2 is formed in the base 3 and in the tabs 7.

In alignment with bore 9 there is formed another bore 10 in the wedge shaped cross piece 6.

The fixing device 1 in accordance with the invention is to be inserted into a hole of standard shape 11 made in a holding member 12 which in the present form of embodiment is a panel.

Figure 2:
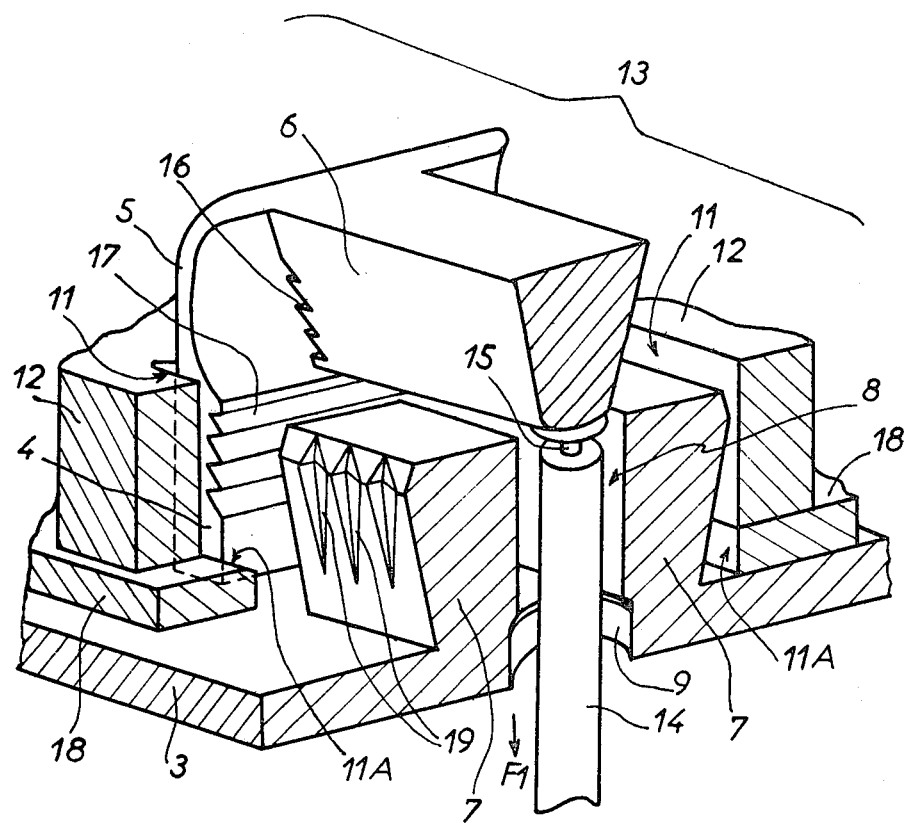
FIG. 2 is a perspective view, half in cross section, of another form of embodiment of the fixing device according to the invention which is locked in place by a traction means.

In the form of embodiment shown on FIG. 2 the fixing device in accordance with the invention is rivet piece 13 traversed by a traction rod 14.

The fixing device according to this form of embodiment also comprises a base 3 supporting a cage 4 having two deformable walls 5 facing each other and a wedge shaped cross piece 6. Two flexible fixation tabs 7 separated by an interval or slot 8 are also disposed under the cross piece.

A bore 9 is formed in base 3 to allow for the passage of the traction rod 14 which is connected to the wedge 6 by a breakable zone 15. The traction rod passes freely between the two flexible fixation tabs 7.

It is to be noted that the connection of the traction rod 14 to the wedge 6 by the breakable zone 15 permits such a piece to be moulded in a single injection moulding and that no screw is required.

The fixing devices in accordance with the invention are advantageously made from a mouldable plastic material. In the rivet piece 13 the wedge shaped cross piece 6 is not connected to the deformable walls 5 for all of its cross section thereby leaving a portion of it free opposite each deformable wall 5. Said free portion is provided with retaining notches 16 intended for engagement with other retaining notches 17 inwardly formed on the cage 4 below the deformable walls 5.

The outer faces of the flexible tabs 7 which come into contact with the walls of the bore 11 of the holding member 12 may advantageously have knurled portions 19 for improving fixation.

The fixing devices in accordance with the invention are used as follows:

the fixation device 1 is inserted perpendicularly into the opening 11 in the holding member 12 and is blocked by means of a screw 2 if it acts as a nut or by means of any traction means 14 if it acts as a rivet piece.

The nut piece being inserted into the corresponding hole 11 in the holding panel 12, the screw 2 for said nut piece is introduced through the part to be secured 18 and then through the bore 9 whereupon it is screwed by self tapping into the bore 10 in the wedge 6. When the base 3 includes a secondary fastening function in another zone, not shown, the screw is directly introduced through the bore 9 and then is screwed by self tapping into the bore 10 in the wedge 6. The wedge is pulled in by the screw 2 and penetrates the slot 8 thereby spreading the fixation tabs 7 apart and locking very positively the nut piece to the holding member.

The pulling motion of wedge 6 is obtained by the deformable walls 5 of the cage 4 being independent of the flexible fixation tabs 7 thereby enabling the wedge 6 to sufficiently spread apart the latter for blocking the nut on the holding panel in a completely positive way. Moreover, depending on the degree of spreading of the flexible fixation tabs 7 the same nut can be fixed both to thin and thick panels.

The fixing assembly can thereafter be dismounted for a renewed utilization; it is then sufficient to unscrew and extract the parts.

The rivet piece 13 is used as the nut piece with the screw being replaced by the traction rod 14 secured to the locking wedge 6.

After positioning of the rivet piece a tractive force (arrow F1) lowers wedge 6 into the slot 8 while complementary notches 16 and 17 in the wedge 6 and the cage 4 engage with one another as the wedge penetrates the slot. When the assembly is blocked the rod is disconnected from the wedge 6 after rupture of the breakable zone 15 of suitable strength.

The rivet piece once in the appropriate position cannot be dismounted and used again but the screw can be removed and a single piece can fulfil the same functions in repeated usage.

In the form of embodiment with the rivet piece the holding member 12 being formed with a hole 11, the part to be assembled 18 is also bored as at 11A and is disposed between the base 3 and the holding member 12.

It is apparent that the present invention was only described and illustrated with reference to a preferred form of embodiment and that equivalent parts can be substituted for its constitutive elements without departing from the principles and spirit of the invention, the scope of which is defined in the appended claims.

I claim:

1. A fixing device for securing any part to a holding member such as a panel formed with a bore therein of a standard shape, said device comprising:
   spreadable means in said bore formed in said holding member on the one hand and
   on the other hand spreading means;
   actuating means being provided to drive said spreading means into said spreadable means so that depending on the length of penetration of said spreading means the fixing device is locked to said holding member and accommodates any thickness variations in said holding member, further including:
   a cage;
   two deformable walls in said cage;
   a wedge comprised by said spreading means, carried by said two deformable walls, a traction rod comprised by said actuating means;
   a breakable zone connecting said traction rod to said wedge,
   immobilization means to fix said wedge between said spreadable means in a predetermined position of penetration therein, the traction rod being disconnectible from the wedge upon breakage of said breakable zone without the wedge moving from its predetermined position of penetration, the fixing device acting as a rivet traversing both the part to be fastened and the holding member.

2. A device as in claim 1 wherein
   said immobilization means to secure said wedge between said spreadable means consists of retaining notches provided in said wedge on the one hand and on the other hand in said cage, said notches engaging with one another progressively as said wedge penetrates said spreadable means.

3. A one piece plastic fastener adapted to be secured in a complimentary apertured support including a head having a central bore therethrough, and engaging and overlying said apertured support, two leg means extending integrally from said head and separated by slot means including a continuation of said bore, rectilinear wedge means initially positioned in line with but remote from said slot means at a position remote from said head, deformable means integrally interconnecting said wedge means to said head, actuation means extending through said head bore and said slot means to engage said wedge means and facilitate movement of said wedge means into said slot means by bending said deformable means and thereby spread said leg means into engagement with the walls of said support aperture.

4. A fastener of the type claimed in claim 3 wherein said wedge means includes a bore aligned with the head bore and said actuation means is a screw that engages said wedge bore and draws said wedge into said slot means to expand said leg means.

5. A fastener of the type claimed in claim 3 wherein said actuation means is a traction rod coaxially disposed within said head bore and integrally connected to said wedge means whereby axial movement of said traction rod through said head bore moves said wedge means into said slot means and expands said leg means.

6. A fastener of the type claimed in claim 5 wherein said traction rod includes a reduced fracturable portion which breaks when subjected to a predetermined tension.

* * * * *